United States Patent Office 3,753,964
Patented Aug. 21, 1973

3,753,964
POLYMERIZATION OF OLEFINS WITH TETRAKIS (BICYCLOHEPTYL)VANADIUM COMPOUNDS AS CATALYSTS
Wendell P. Long, Wilmington, Del., assignor to Hercules Incorporated, Wilmington, Del.
No Drawing. Continuation-in-part of abandoned application Ser. No. 112,020, Feb. 2, 1971. This application Dec. 8, 1971, Ser. No. 206,147
Int. Cl. C08f 15/04, 1/42
U.S. Cl. 260—88.2 R                    9 Claims

ABSTRACT OF THE DISCLOSURE

Tetrakis(1 - bicyclo - [2.2.1] - heptyl)vanadium compounds are catalysts for the polymerization of 1-olefins when activated by a halogen-containing aluminum compound such as AlCl$_3$ or an alkylaluminum halide.

---

This application is a continuation-in-part of my U.S. application Ser. No. 112,020, filed Feb. 2, 1971 now abandoned.

This invention relates to a process of polymerizing 1-olefins to form solid polymers, and more particularly to the process wherein the catalyst is a tetrakis(bicycloheptyl)vanadium compound activated by an aluminum compound.

It is well known that 1-olefins such as ethylene and propylene can be polymerized using as catalyst a vanadium halide such as VCl$_4$ or VOCl$_3$ or a vanadium oxy trialkoxide such as VO(OC$_2$H$_5$)$_3$ in combination with an alkylaluminum compound. While such catalysts have very high activities at the start of the polymerization process, their activity ceases after only a few minutes. Consequently, in order to maintain polymerization, the vanadium compound must be introduced continuously or some means must be found to regenerate or reoxidize the inactive divalent vanadium that is formed.

Now in accordance with this invention, it has been found that tetrakis(bicycloheptyl)vanadium compounds are not only extremely active catalysts for the polymerization of 1-olefins, but maintain their activity when an aluminum compound containing halogen is used as the activator.

The tetrakis(1 - bicycloheptyl)vanadium compounds used as catalysts for the polymerization of 1-olefins in accordance with this invention have the general formula

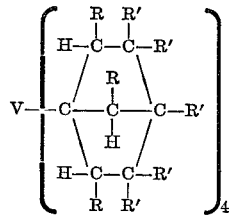

where one R is H or CH$_3$ and each of the others is H and each R' is H or CH$_3$, and the total number of CH$_3$ groups attached to the bicycloheptyl ring is 0 to 3. Exemplary of these tetravalent vanadium compounds that can be used are tetrakis(1-bicyclo-[2.2.1]-heptyl)vanadium which can also be named tetrakis(1-norbornyl)-vanadium; and the corresponding compounds where the bicycloheptyl radical is 2-methyl-1-bicyclo-[2.2.1]-heptyl
3-methyl-1-bicyclo-[2.2.1]-heptyl
4-methyl-1-bicyclo-[2.2.21]-heptyl
7-methyl-1-bicyclo-[2.2.1]-heptyl
2,3-dimethyl-1-bicyclo-[2.2.1]-heptyl
2,4-dimethyl-1-bicyclo-[2.2.21]-heptyl
2,5-dimethyl-1-bicyclo-[2.2.21]-heptyl
3,3-dimethyl-1-bicyclo-[2.2.1]-heptyl
3,4-dimethyl-1-bicyclo-[2.2.1]-heptyl
3,5-dimethyl-1-bicyclo-[2.2.1]-heptyl
3,7-dimethyl-1-bicyclo-[2.2.1]-heptyl
4,7-dimethyl-1-bicyclo-[2.2.1]-heptyl
2,3,3-trimethyl-1-bicyclo-[2.2.1]-heptyl also known as 1-camphyl
2,3,4-trimethyl-1-bicyclo-[2.2.1]-heptyl
2,3,5-trimethyl-1-bicyclo-[2.2.1]-heptyl
2,5,5-trimethyl-1-bicyclo-[2.2.1]-heptyl
3,3,7-trimethyl-1-bicyclo-[2.2.1]-heptyl
3,4,6-trimethyl-1-bicyclo-[2.2.1]-heptyl
3,4,7-trimethyl-1-bicyclo-[2.2.1]-heptyl The tetrakis(bicycloheptyl)vanadium compounds can be prepared by reacting the corresponding bridgehead lithium compound with an anhydrous vanadium salt. In many cases, it is advantageous to use an ether complex of the metal salt. The bicyclo vanadium compound so produced is always a tetravalent vanadium compound regardless of the valence of the vanadium salt reacted with the lithium compound. When lower valency vanadium compounds are used the tetravalent vanadium is generated by a disproportionation reaction with the formation of lower valent vanadium compounds or vanadium metal. Exemplary of the vanadium salts that can be reacted to produce these tetra bridgehead vanadium compounds are vanadium tetrachloride, vanadium tetra(tert.-butoxide), vanadium trichloride tetrahydrofuranate (VCl$_3$·3THF), etc. The bridgehead lithium compound is, as described in the literature, generally prepared by reaction of a bridgehead halide with metallic lithium.

The reaction between the bridgehead lithium compound and the vanadium salt can be carried out in an inert aliphatic hydrocarbon diluent such as pentane, hexane, heptane, octane, etc. In general, the reaction is started at a low temperature such as −78° C., and continued at a temperature of from about 0° C. to about 90° C. The following preparation of tetrakis(1 - bicyclo-[2.2.1]-heptyl)-vanadium is typical of the methods used for the preparation of the tetrakis(bicycloheptyl)vanadium compounds used in this invention.

Preparation of tetrakis(1-bicyclo-[2.2.1]-heptyl) vanadium 1-norbornyllithium was prepared by adding a solution of 10.0 g. of 1-norbornyl chloride in 20 ml. of hexane to a refluxing dispersion (under argon) of 2 g. of lithium in 20 ml. of hexane during a period of 3 hours. The reaction mixture was refluxed for 16 hours and then was allowed to separate at room temperature into phases. The hexane phase was separated and the solvent and volatile by-products were removed under reduced pressure.

A reactor with a nitrogen atmosphere was charged (at −78° C.) with 1.47 millimoles of vanadium tetra(tert.-butoxide), 6.39 millimoles of 1-norbornyllithium and 25 ml. of pentane. The reaction temperature was then raised to 80° C. and the mixture was stirred for 4 hours. The pentane phase was then filtered through a column of basic alumina. The pentane was removed from the filtrate, the residue was washed with pentane and then was dried under vacuum. The yield of tetrakis(1-norbornyl) vanadium was 22% based on the 1-norbornyllithium.

These tetrakis(bicycloheptyl)vanadium compounds are outstanding catalysts for the polymerization of ethylene, including both the homopolymerization of ethylene and the copolymerization of ethylene with 1-olefins as, for example, propylene, butene-1, hexene-1, 4-methylpentene-1, octene-1, etc., and mixtures of these olefins. Also, they are less outstanding but nevertheless effective catalysts for the homopolymerization of propylene and higher 1-olefins such as butene-1.

As already pointed out, the tetrakis(bicycloheptyl) vanadium compounds are unique in their ability to sustain the polymerization reaction. They have the further advantage of being stable in air and moisture at room temperature in contrast to $VCl_4$ which is unstable in air or in the presence of moisture and $VOCl_3$ which also must be rigorously protected from moisture. Hence, the operation of the polymerization procedure is greatly simplified.

In general, the polymerization can be carried out in batch or continuous processes. Generally the polymerization process is carried out in the presence of a liquid diluent such as a liquid hydrocarbon, which can be any aliphatic, cycloaliphatic or aromatic hydrocarbon that is free of ethylenic unsaturation. Exemplary of such diluents are pentene, hexane, heptane, isooctane, decane, cyclohexane, benzene, toluene, xylene, etc. A mixture of the olefin being polymerized and the liquid hydrocarbon can be allowed to flow over a fixed catalyst bed or the olefin can be passed into a mixture of the catalyst and the liquid hydrocarbon. In the latter case, the process can be operated as a slurry process by operating at a temperature below that at which the polymer dissolves or as a solution process by operating at a temperature above that at which the polymer dissolves.

In the polymerization and copolymerization of ethylene these vanadium compounds can be activated by the addition of strong Lewis acids such as those of a halogen-containing aluminum compound as, for example, an aluminum halide, an alkylaluminum halide, etc. Such compounds will have the formula $R_nAlX_{3-n}$ where R is an alkyl group containing 1 to 20 carbon atoms, X is halogen such as chlorine or bromine and $n$ is 0 to 2. Exemplary of these compounds are aluminum trichloride, aluminum tribromide, ethylaluminum dichloride, diethylaluminum chloride, ethylaluminum sesquichloride, isobutylaluminum dichloride, diisobutylaluminum chloride, dioctylaluminum chloride, didodecylaluminum chloride, etc., and the corresponding bromides. For the polymerization of propylene the preferred activator is a dialkylaluminum halide of the type exemplified above. The molar ratio of the aluminum compound to the vanadium compound can be varied widely, but generally is within the ratio of from about 1:1 to about 2000:1 and more usually from about 10:1 to about 500:1.

The temperature at which the polymerization is carried out will depend upon the type of process used and the monomer, or monomers, being polymerized, but generally will be within the range of from about 0° C. to about 70° C. At temperatures above about 70° C., essentially no polymerization occurs when ethylene is being polymerized and the highest rates of polymerization for ethylene are obtained at room temperature. For propylene polymerization, the optimum temperature is below 10° C. Any pressure, from subatmospheric to as high as 30 atmospheres or more, can be used. Any amount of the vanadium compound can be used to catalyze the polymerization from a minor catalytic amount to a large excess, if desired. Because these tetrakis(bicycloheptyl) vanadium compounds are such active catalysts, as can be seen from the examples below, they can often be used at a concentration as low as 0.1 micromole per liter, i.e., 0.0001 millimole per liter, and still produce a very active polymerization, provided there is enough of the activator present.

Best results in the homopolymerization of propylene are obtained when the reaction is irradiated with light having a wave length of from 280 to 600 nanometers.

The following examples illustrate the process of this invention.

EXAMPLE 1

A 340 ml. polymerization vessel was flushed with argon and then was charged with 50 ml. of n-heptane and $2.5 \times 10^{-5}$ mole of diethylaluminum chloride. The vessel was thermostatted at 55° C. and pressured to 30 p.s.i.g. with ethylene. There was then injected $1.0 \times 10^{-5}$ mole of tetrakis(1-norbornyl) vanadium and polymer immediately began to form. After 1.8 hours at 55° C., the vessel was vented and cooled. The polyethylene was isolated and amounted to 32 g./mmole of vanadium and the rate was 9 g./mmole V/atm./hr.

EXAMPLE 2

The procedure of Example 1 was repeated except that $1.0 \times 10^{-7}$ mole of the vanadium compound was used, $5.0 \times 10^{-5}$ mole ethylaluminum dichloride was used as the activator and the polymerization was carried out at 40° C. The polymerization was terminated at 0.9 hour although monomer was still being consumed. The polyethylene so obtained amounted to 10,590 g. per millimole of vanadium and the rate was 6000 g./mmole V/atm./hr. The polymer had an intrinsic viscosity of 12.5 dl./g. (measured on a 0.1% solution in decahydronaphthalene at 135° C.).

As a control example, the above procedure was exactly duplicated except that $1.0 \times 10^{-7}$ mole of vanadium oxychloride ($VOCL_3$) was injected instead of the tetrakis (1-norbornyl) vanadium. Polymerization of ethylene immediately occured but ceased before about 2 minutes. The yield of polyethylene so produced was 1630 g. per millimole of vanadium.

EXAMPLES 3–9

In these examples ethylene was polymerized following the general procedure described in Example 2 using tetrakis(1-norbornyl)vanadium as the catalyst and ethylaluminum dichloride as the activator. Examples 3–5 demonstrate that the concentration of the vanadium catalyst has little effect on the rate at which the polyethylene is produced, whereas as can be seen from Examples 6–8 the temperature at which the polymerization is carried out greatly affects the rate of polymerization. Example 9 demonstrates that when benzene is used as the diluent, the intrinsic viscosity of the polymer is reduced (I.V. of 4.0 as measured on a 0.1% solution in decahydronaphthalene at 135° C.), but the rate of polymerization is unaffected. Tabulated below are the data for each of these examples.

| Ex. | Moles tetrakis (norbornyl) vanadium | Moles $C_2H_5AlCl_2$ | Diluent | Reaction Temp., °C. | Reaction Time, hr. | Polyethylene produced Yield, g./mmole V | Polyethylene produced Rate, g./mmole/ atm./hr. |
|---|---|---|---|---|---|---|---|
| 3 | $3.0 \times 10^{-7}$ | $5.0 \times 10^{-5}$ | n-Heptane | 40 | 0.5 | 3,400 | 4,000 |
| 4 | $1.0 \times 10^{-7}$ | $5.0 \times 10^{-5}$ | do | 40 | 0.9 | 10,600 | 6,000 |
| 5 | $0.3 \times 10^{-7}$ | $5.0 \times 10^{-5}$ | do | 40 | 0.9 | 6,700 | 4,000 |
| 6 | $1.0 \times 10^{-7}$ | $5.0 \times 10^{-5}$ | do | 28 | 0.4 | 7,670 | 10,500 |
| 7 | $1.0 \times 10^{-7}$ | $5.0 \times 10^{-5}$ | do | 40 | 0.9 | 10,600 | 6,000 |
| 8 | $1.0 \times 10^{-7}$ | $5.0 \times 10^{-5}$ | do | 75 | 0.7 | ---------- | [1] 0 |
| 9 | $0.8 \times 10^{-7}$ | $5.0 \times 10^{-5}$ | Benzene | 34 | 1.0 | 8,200 | 4,100 |

[1] No polymerization at 75° C. but on cooling, polymer began to form and at about 40° C. the rate was 4.600.

EXAMPLE 10

The procedure of Example 2 was repeated except that hydrogen was added and the polymerization was carried out at 40° C. The polyethylene so obtained had an intrinsic viscosity of 8.4 dl./g. and was produced at a rate of 5000 g./mmole V/atm./hr.

EXAMPLE 11

A 340 ml. polymerization vessel was flushed with argon and then was charged with 50 ml. of benzene (purified by washing with sulfuric acid, then passing it through silica and molecular sieves and then sparged with argon) and 4 ml. of a solution of such a purified benzene saturated with aluminum trichloride which was equivalent to $6 \times 10^{-6}$ mole of $AlCl_3$. The reactor was thermostatted at 40° C., pressured to 30 p.s.i.g. with ethylene, and then $1.0 \times 10^{-7}$ mole of tetrakis(1-norbornyl)vanadium was injected. Polymerization ensued immediately. Ethylene consumption appeared to cease after about 40 minutes and the polymerization was terminated. The polyethylene so obtained amounted to a yield of 4230 g. per millimole of vanadium and the rate was 3200 g./mmole V/atm./hr.

EXAMPLE 12

A 340 ml. polymerization vessel was flushed with argon and then was charged with 50 ml. of n-heptane and $5.0 \times 10^{-5}$ mole of ethylaluminum dichloride. The vessel was thermostatted at 40° C. and first was pressured to 25 p.s.i.g. with ethylene and then to 30 p.s.i.g. with propylene. There was then injected $1.5 \times 10^{-7}$ mole of tetrakis(1-norbornyl)vanadium. Polymerization immediately ensued. After 1.2 hours, the vessel was vented and cooled. The rate of polymerization was 750 g./mmole V/atm./hr. The polymer product was extracted by refluxing hexane. The hexane-soluble fraction amounted to 14% of the total polymer and on analysis was shown to be an ethylene-propylene copolymer containing about 20 mole percent of propylene. The other 86% of the polymer was polyethylene.

EXAMPLES 13 THROUGH 23

In these examples a 340 ml. glass polymerization vessel was flushed with argon and then charged with 50 ml. of n-heptane. The vessel was then thermostatted at a preselected temperature as noted in the following table and pressured to 30 p.s.i.g. with propylene. Next, an activator and tetrakis(norbornyl)vanadium, in the order named, were introduced into the reactor as standard solutions in n-heptane, the identity of the activator and the amounts of activator and catalyst being as noted in the following table. The polymerization vessel was stirred for a prescribed number of hours while being irradiated by a 275 watt GE sunlamp placed 12 inches from the reaction vessel. At the end of the reaction period the insoluble polymer was recovered by centrifugation at room temperature from the n-heptane diluent, while the soluble polymer which remained in solution was isolated by evaporation of the n-heptane. Further data are given in the table.

| Ex. No. | Vanadium compound, moles×10⁻⁶ | Activator Compound | Activator Moles ×10⁻⁶ | Temp., °C. | Time, hours | Polymer Insoluble | Polymer Soluble | Productivity, g./mmole V | Rate [a] |
|---|---|---|---|---|---|---|---|---|---|
| 13 | 10 | Me₂AlCl | 30 | 7 | 19 | 0.058 | 0.315 | 38 | 0.65 |
| 14 | 10 | Me₂AlCl | 100 | 7 | 20 | 0.221 | 1.197 | 142 | 2.5 |
| 15 | 3.7 | Me₂AlCl [b] | 60 | 4 | 18 | 0.055 | 0.662 | 194 | 3.5 |
| 16 | 10 | Et₂AlCl | 100 | 5 | 17.5 | 0.198 | 1.207 | 141 | 2.7 |
| 17 | 3.7 | Et₂AlCl [b] | 60 | 4 | 18 | 0.097 | 1.041 | 308 | 5.7 |
| 18 | 3.7 | Et₂AlI [b] | 60 | 4 | 18 | 0.035 | 0.185 | 59 | 1.1 |
| 19 | 3.7 | iBu₂AlCl [b] | 60 | 4 | 18 | 0.163 | 1.006 | 340 | 6.3 |
| 20 | 3.0 | iBu₂AlCl; H₂O | 60;25 | 2 | 18 | 0.089 | 0.894 | 328 | 5.9 |
| 21 | 1.0 | iBu₂AlCl | 60 | 0 | 19 | 0.011 | 0.189 | 200 | 3.5 |
| 22 | 3.7 | Et₃Al | 60 | 4 | 18 | | | [c] 0 | |
| 23 [d] | 10 | Me₂AlCl | 30 | 7 | 19 | | | [e] 0 | |

[a] Grams of polymer/mmole V/atm./hr. without regard as to whether or not polymer was formed over entire reaction period.
[b] Freshly distilled.
[c] Et₃Al apparently a poor activator.
[d] Reaction performed in the dark.
[e] Reaction apparently requires light under the conditions of the experiment.

What I claim and desire to protect by Letters Patent is:
1. The process of polymerizing a 1-monoolefin which comprises contacting at a temperature in the range of from about 0° C. to about 70° C. a 1-monoolefin with a catalyst comprising a tetrakis(1-bicycloheptyl)vanadium compound having the formula

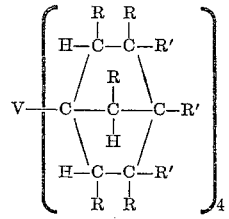

where one R is H or $CH_3$ and the other R's are H and each R' is H or $CH_3$, and the total number of $CH_3$ groups attached to the bicycloheptyl ring is 0 to 3, wherein the vanadium compound is activated by the addition of a compound having the formula $R_nAlX_{3-n}$ wherein R is alkyl containing 1 to 20 carbon atoms, X is halogen and $n$ is 0 to 2; and, when homopolymerizing propylene and higher 1-monoolefins, irradiating with light having a wavelength of from about 280 to about 600 nanometers.

2. The process of claim 1 wherein the vanadium compound is activated by aluminum trichloride.

3. The process of claim 1 wherein the vanadium compound is activated by an alkylaluminum halide.

4. The process of claim 3 wherein the alkylaluminum halide is an ethylaluminum halide.

5. The process of claim 1 wherein ethylene is polymerized.

6. The process of claim 1 wherein ethylene is copolymerized with at least one other 1-monoolefin.

7. The process of claim 6 wherein ethylene is copolymerized with propylene.

8. The process of claim 1 wherein propylene is polymerized.

9. The process of claim 1 wherein the vanadium compound is tetrakis(1-norbornyl)vanadium.

References Cited

UNITED STATES PATENTS

| | | | |
|---|---|---|---|
| 2,924,594 | 2/1960 | Breslow | 260—94.9 B |
| 3,655,583 | 4/1972 | Yamamoto et al. | 260—94.9 B |
| 3,666,743 | 5/1972 | Bower et al. | 260—94.9 B |

JOSEPH L. SCHOFER, Primary Examiner

A. HOLLER, Assistant Examiner

U.S. Cl. X.R.

252—429 B; 260—93.7, 94.9 B, 94.9 DA; 204—159.24